US009036029B2

(12) United States Patent
Butler

(10) Patent No.: US 9,036,029 B2
(45) Date of Patent: *May 19, 2015

(54) ACTIVE CLOAKING WITH WIDEBAND TRANSDUCERS

(71) Applicant: John L. Butler, Cohasset, MA (US)

(72) Inventor: John L. Butler, Cohasset, MA (US)

(73) Assignee: Image Acoustics, Inc., Cohasset, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,609

(22) Filed: Aug. 29, 2014

(65) Prior Publication Data

US 2014/0369160 A1  Dec. 18, 2014

Related U.S. Application Data

(63) Continuation-in-part of application No. 13/116,353, filed on May 26, 2011, now Pat. No. 8,836,792.

(51) Int. Cl.
H04N 5/33 (2006.01)
H04K 3/00 (2006.01)

(52) U.S. Cl.
CPC ... *H04K 3/82* (2013.01); *H04N 5/33* (2013.01)

(58) Field of Classification Search
CPC ................................... H04K 3/82; H04N 5/33
USPC .......................................................... 348/163
IPC ........................................................ H04N 53/00
See application file for complete search history.

(56) References Cited

U.S. PATENT DOCUMENTS

| 3,721,949 | A | * | 3/1973 | Hubbard et al. | 367/1 |
|---|---|---|---|---|---|
| 4,227,110 | A | * | 10/1980 | Douglas et al. | 310/316.01 |
| 4,300,215 | A | * | 11/1981 | Jones | 367/11 |
| 4,332,986 | A | | 6/1982 | Butler | |
| 4,742,499 | A | | 5/1988 | Butler | |
| 4,754,441 | A | | 6/1988 | Butler | |
| 4,845,688 | A | | 7/1989 | Butler | |
| 4,864,548 | A | | 9/1989 | Butler | |
| 5,047,683 | A | | 9/1991 | Butler et al. | |
| 5,184,332 | A | | 2/1993 | Butler | |
| 6,052,335 | A | * | 4/2000 | Korolenko | 367/121 |
| 6,734,604 | B2 | | 5/2004 | Butler et al. | |
| 6,950,373 | B2 | | 9/2005 | Butler et al. | |
| 7,106,656 | B2 | * | 9/2006 | Lerro et al. | 367/99 |
| 7,292,503 | B2 | | 11/2007 | Butler et al. | |
| 7,372,776 | B2 | | 5/2008 | Butler et al. | |
| 7,453,186 | B1 | | 11/2008 | Butler et al. | |
| 7,692,363 | B2 | | 4/2010 | Butler et al. | |
| 2005/0088916 | A1 | * | 4/2005 | Zhu et al. | 367/134 |
| 2010/0094152 | A1 | * | 4/2010 | Semmlow | 600/528 |
| 2011/0007606 | A1 | * | 1/2011 | Curtis | 367/103 |

* cited by examiner

*Primary Examiner* — Tung Vo
(74) *Attorney, Agent, or Firm* — David M. Driscoll, Esq.

(57) ABSTRACT

Electro-mechanical transducers are used to actively cloak a targeted object in a way that absorbs incoming waves without reflection, sends them out the opposite side of the target and returns the wave without leaving a shadow behind the target. The present invention pertains to an improvement in the cloaking of an object without requiring the use of special materials for the object itself and allows the use of SONAR and other possible transducer systems that would be covered and rendered ineffective with passive cloaking materials. Other means are also provided for extending the bandwidth as well as increasing the efficiency for cloaking or other transducers.

19 Claims, 16 Drawing Sheets

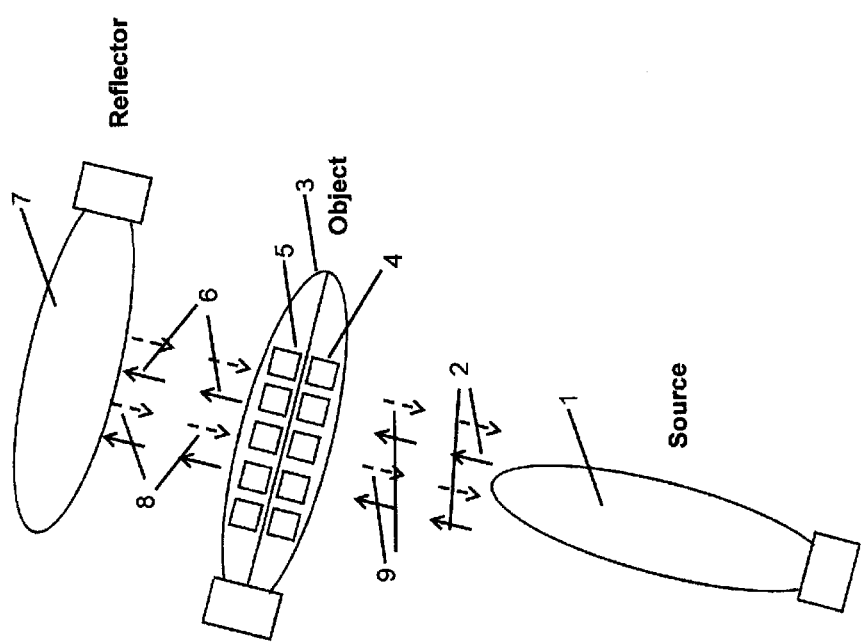

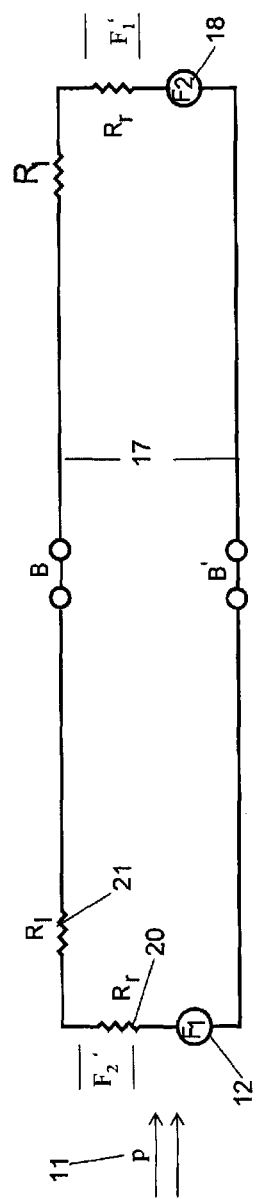

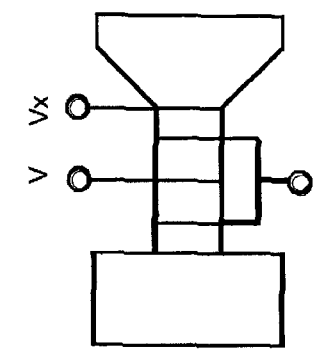
Fig 3a
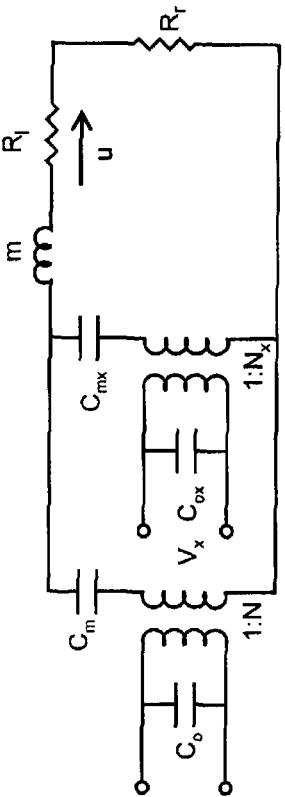
Fig 3b
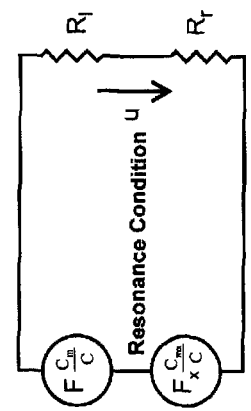
Fig 3c — Thevenin Reduction
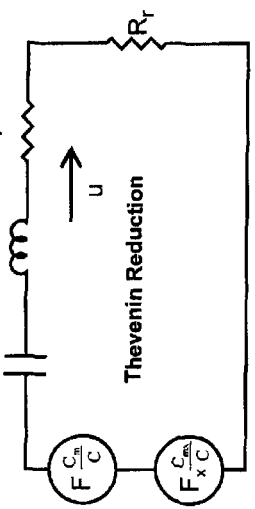
Fig 3d — Resonance Condition

ACTIVE CLOAKING WITH WIDEBAND TRANSDUCERS

RELATED APPLICATION

This application is a continuation-in-part (CIP) of U.S. Ser. No. 13/116,353 filed on May 26, 2011 and which is incorporated by reference herein in its entirety.

FIELD OF THE INVENTION

The present invention relates in general to a novel cloaking technique. More particularly, the present invention pertains to an improvement in the cloaking of an object without requiring the use of special materials for the object itself and including means for wideband operation.

BACKGROUND OF THE INVENTION

In a typical acoustic cloaking condition the plane waves from a distant enemy sonar source arrive at the object and emerge from the opposite side, reflect or scatter from particles of the medium and any other reflecting objects such as the ocean surface or bottom, and return back to the sonar source as if there were no targeted object in the path of the waves. With passive cloaking the waves appear to bend around the object as if the object were not there. One form of passive cloaking involves the provision of special materials for the object.

There presently exist efforts to develop inactive metamaterials for cloaking spherical (or other shape) shells so as to both eliminate backscattering and fill in the shadow zone behind the shell. An analytical model for this has been given by Cummer et al. ["Scattering Theory Derivation of a 3D Acoustic Cloaking Shell," Phys. Rev. Lett. 100, 024301 (2008)], which develops the case for an ideal spherical shell. The development of such cloaking materials for spherical and other shapes is meant to inhibit the acoustic detection of objects, such as mines, torpedoes, UUV's and, ultimately, submarines by making the object invisible to acoustic waves. This form of inactive cloaking however covers the target in a way that shields the target from using its own acoustic sonar means for detecting the source, unless the cloaking is turned off. Although it may be possible to eventually develop active metamaterials, which could be turned on or off, the present invention proposes an alternative approach.

Accordingly, it is an object of the present invention to provide an active cloaking transducer system which effectively cloaks the target and yet can also be used as a conventional active, acoustic sonar source and receiver along with means for wideband operation.

SUMMARY OF THE INVENTION

In accordance with the present invention there is provided an active transducer cloaking system wherein the targeted object to be cloaked is covered by a transducer array of elements that are preferably small and light in weight compared to the object. In an active cloaking transducer system, in accordance with the present invention, the acoustic waves that strike the object are absorbed by the transducers with no reflection, are passed through the object electrically and emerge acoustically from the opposite side. Reflections from particles in the medium, ocean bottom or surface or additional objects of these emerging waves are then received from the transducers on this opposite side and sent back through the transducers to emerge from the initial side as if there were nothing lost in the forward and backward transmission through the target object. In a sense, the object becomes invisible to the incoming waves and allows them to pass through the object as though it were not there.

It may be appreciated that with transducer cloaking the waves are converted to electrical signals and pass through the target rather than around the target, as in the case of conventional passive cloaking And it may readily be appreciated that this transducer based cloaking invention may be applied to any system that uses waves, such as radar or optical means.

BRIEF DESCRIPTION OF THE DRAWINGS

Reference is now made to the following drawings for an illustration of a preferred embodiment of the technique of the present invention. Numerous other objects, features and advantages should now become apparent upon a reading of the following detailed description taken in conjunction with the accompany drawings, in which:

FIG. 1a is an illustration of an active transducer cloaking system of the present invention showing a transducer array of transducer projectors, 4 and 5, on both sides of the targeted object, a possible reflector along with a source of incident acoustic wave fronts, as solid lines, and returning wave fronts, as dashed lines.

FIGS. 2a, 2b, 2c are respective illustrations of a pure transduction system which accomplishes active cloaking by means of an array of reciprocal transducers which act as both sound projectors and receiving hydrophones. FIG. 2a shows the set up using two connected piezoelectric transducers, one on either side of the object. FIG. 2b shows an equivalent circuit representation of the two connected transducers of FIG. 2a. FIG. 2c is the equivalent circuit representation at resonance where m and $C_m$ as well as $L_0$ and $C_0$ of FIG. 2b cancel and only resistances are left in the circuit.

FIGS. 3a, 3b, 3c, 3d are respective illustrations of means for eliminating resistive losses in the equivalent circuit of FIGS. 2a and 2b. FIG. 3a is an illustration of a modification of the piezoelectric transducers of FIG. 2a, which allows an additional signal, $V_x$, to be injected into the transducers at the terminal of a transducer element to replace any power loss due to inefficiencies. FIG. 3b is an equivalent circuit for the two port device shown in FIG. 3a. FIG. 3c is a Thevenin reduced equivalent circuit for the forces of FIG. 3b. FIG. 3d is the Thevenin reduced circuit of FIG. 3c at resonance FIG. 4 may also be modified to include transducers with two ports, as in FIG. 3a, allowing one of the ports of each transducer to be used as a built in hydrophone receiver instead of the separate hydrophones $H_1$ and $H_2$.

DETAILED DESCRIPTION

Figure 1B:
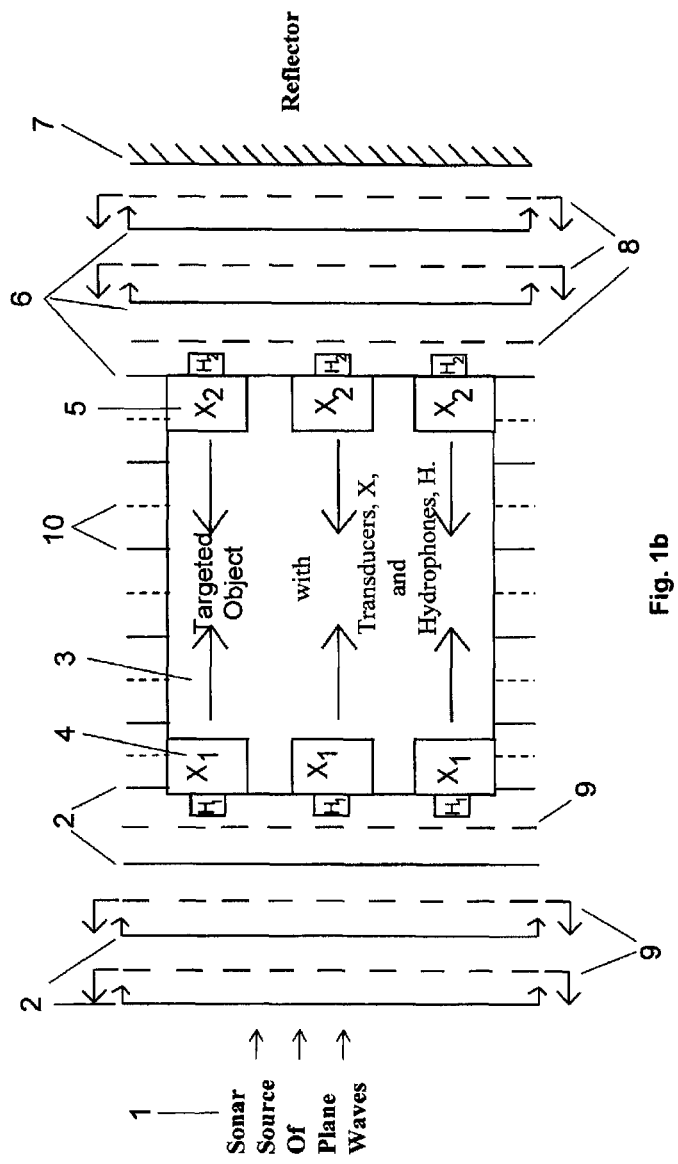
FIG. 1b is a schematic illustration of an active transducer cloaking system of the present invention showing a small transducer array of transducer projectors, $X_1$ and $X_2$, and Hydrophones, $H_1$ and $H_2$, on both sides of the targeted object, such as a submarine, along with a source of incident acoustic wave fronts, as solid lines, and returning wave fronts, as dashed lines.

Reference is now made to FIG. 1 where the waves from the sonar source 1, illustrated by the wave front (solid lines) 2, arrive at the targeted object 3 (e.g. submarine), are absorbed by transducers 4 (without creating reflections), are passed through to transducers 5, retransmitted from the opposite side as wave front (solid lines) 6, arrive at a possible reflection 7, pass back as wave front (dashed lines) 8, pass on through the targeted object 3 and emerge as wave front (dashed lines) 9 from transducers $X_1$, as if the targeted object were not there. Note that in this representation the portion of the wave that passes through the targeted object is also timed to emerge at the same time as the portion of the wave 10 passes around on the outside of the target object 3. In FIG. 1 the solid lines indicate the waves entering and the dashed lines indicate the waves returning.

Figure 2A:
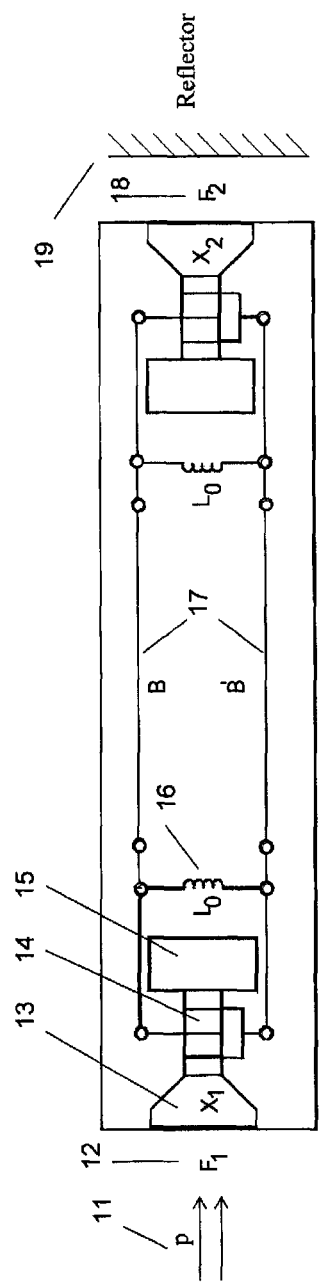
Figure 2B:
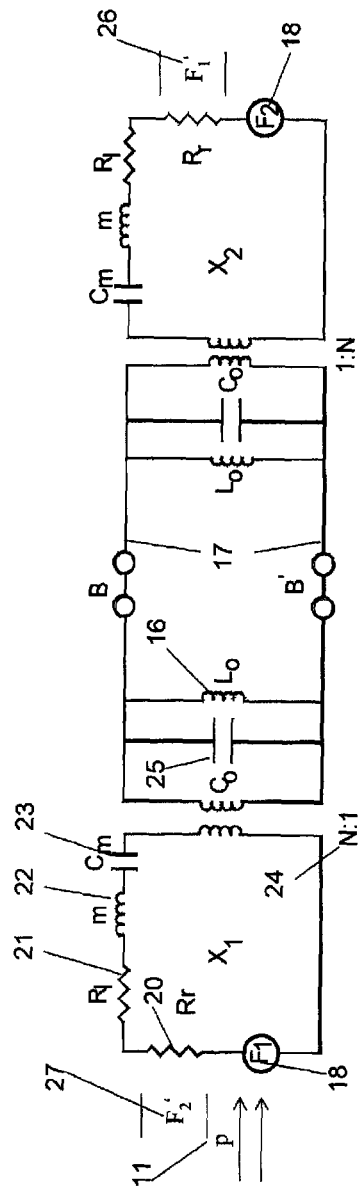

Refer now to FIGS. 2a, 2b and 2c which illustrate the transducer invention without the use of hydrophones, amplifiers or equalizers. This embodiment would have application where time delays are not significant and can be ignored as in the case of a small target. FIG. 2a shows a scheme for active cloaking illustrating a physical port-starboard arrangement about the targeted object. FIG. 2b is an illustration of the corresponding electrical equivalent circuit where $F_1$ is input force and $F_2$ is the return force after reflection. FIG. 2c is the equivalent circuit of FIG. 2b at resonance Consider FIG. 2a which illustrates the case where no hydrophones or amplifiers are used within the targeted object and only reversible matched transducers, electrically connected at B and B', are used. The condition is illustrated in FIG. 2a by, for example, two piezoelectric Tonpilz type piston transducers including a first transducer $X_1$ receiving an acoustic pressure, p, 11 producing a force, $F_1$, 12 on the piston head mass 13, connected to a piezoelectric stack of elements 14, large tail mass 15, electrical tuning inductor, $L_0$, 16 and interconnecting wires 17 along with a possible reflector 19 producing a force, $F_2$, 18 on the second Tonpilz type piston transducer $X_2$. If the tail mass 15 is much larger than the head mass, m, 13, the equivalent circuit simplifies to the circuit shown in FIG. 2b for the two transducers $X_1$ and $X_2$ with head mass, m, 22, short circuit compliance, Cm, 23, clamped capacitances, Co, 25, and electro mechanical ideal transformer turns ratio, N, 24. The inductor L0 is used to shunt tune capacitance $C_0$ at mechanical resonance $f_r = \frac{1}{2\pi}(mC_m)^{1/2}$. In this circuit $F_1$ is the input force 18 from the SONAR acoustic signal pressure, 11, of pressure p, and here the radiation resistance, $R_r$, is 20 and the mechanical loss resistance, $R_1$, is 21. The input wave free field pressure, p is 11, the piston area is A and the plane wave diffraction constant is 2, resulting in an input transducer piston driving force $F_1 = 2pA$. In this teaching and for simplicity we consider the case of planar arrays. If the array or transducer are not planar, $F_1 = pAD_f$, where $D_f$ is the diffraction constant.

The equivalent circuit of FIG. 2b is used to show that the transducer pair may be used to present a matched impedance to the medium; thus, exhibit no reflection, pass the wave through the targeted object and return the wave from any possible reflector, as if the targeted object were not there in the path of the wave. FIG. 2b is used as a basis for calculating, $F_1'$, the output force, 26, and corresponding wave pressure $p' = F_1'/A$ for an input force $F_1 = 2pA$, and for identical transducers $X_1$ and $X_2$, the result may be written as $$F_1' = 2pAR_r/(2Z + Z^2/Z_0) = pAR_r/Z(1+Z/2Z_0) \quad (1)$$

where $$Z = R_{r+R1} + j(\omega m - 1/\omega C_m) \quad (2)$$

and $$1/Z_0 = [1/R_0 + j(\omega C_0/-1/\omega L_0)][2/N^2] \quad (3)$$

A loss resistor, $R_0$, has been added in Eq. (3) to represent the electrical dissipation in each transducer. This resistive loss is typically written as $1/R_0 = \omega C_f \tan \delta$ where $C_f$ is the free capacitance. The quantity $\tan \delta$ is the electrical dissipation factor which is usually a small number less than 0.01 and, consequently, $R_0$ is typically very large.

At resonance, $\omega_r = 2\pi f_r$, and where $L_0$ is chosen to tune out capacitance $C_0$ $$\omega_{r2} = 1/mC_m = 1/L_0C_0 \quad (4)$$

and Eq. (1) becomes $$F_1' = pAR_r/(R_r + R_1)[1 + (R_r + R_1)/R_0N^2] \quad (5)$$

Since $R_0$ is normally very large, Eq. (5) may be written as $$F_1' \approx pA\eta \quad (6)$$

where the mechanical efficiency $\eta = R_r/(R_r + R_1)$. The output pressure is; therefore, $F_1'/A = p\eta$ and, consequently, the transducer translates the incoming pressure right through the transduction system and sends it out on the opposite side as the same pressure reduced by the efficiency. At resonance the corresponding transducer circuit would be reduced to resistive components: loss resistors $R_1$ and radiation resistances $R_r$, illustrated by the all resistive equivalent circuit in FIG. 2c.

If operating at resonance, and the losses are negligible, the output force $F1' \approx pA$ and the input pressure wave, p, would travel through the system and exit as a wave with pressure p with no reflection at the input of transducer X1. This pressure wave would then bounce off the illustrated reflector at some reduced pressure value, p', become the input force here as $F2 = 2p'A$ and arrive back to the input side by exiting from transducer $X_1$ with $F_2' = p_2'A$. This force and reflected pressure, $p_2'$, is the same as would be obtained without the targeted object in place, and thus, with transducer cloaking the targeted object becomes invisible.

The resistive circuit of FIG. 2c may be used to calculate the input impedance of the transducer system. If there is to be no reflection from the targeted object, the invention presents an impedance equal to the wave impedance p/u=ρc, where p is the free field pressure, u is the wave particle velocity, c is the sound speed of the medium and p is the density of the medium. The transducer input mechanical impedance is thus $$F_1/u = 2pA/u = 2(R_r + R_1) = 2R_r\eta = 2A\rho c/\eta \quad (7)$$

and since $F_b = 2pA$ we get $p/u = \rho c/\eta$. If the efficiency were 100% we would have an exact match. For an efficiency of 90% the impedance would be 10% higher than pc.

This resistively matched system occurs at resonance and a low Q design is desired for wideband response. Theoretically, if one of the transducers had components that were complex conjugate matches to the other, they would cancel each other, there would be no need for L0 and the transducer pair would be resistive over an extremely wide band. The goal would be to approach a wide band condition. And this could best be achieved with single crystal piezoelectric material, especially with the improved power factor and lower electrical and mechanical impedance. The transducers could also be readily used as part of a sonar system with sonar amplifiers switched in at BB'.

In reality there will be losses with reduced output and somewhat miss-matched impedance. There will also be losses in the metamaterial passive cloaking case; however, in this transduction invention case it may be possible to inject power into the system using small amplifiers to make up for the losses. This could be done without affecting the direct wiring connection between the transducers on opposite sides of the targeted object. And it is possible to introduce a voltage that will effectively cancel the losses occurring in the loss resistance, $R_1$, of FIGS. 2b and 2c. One method is to add a small independent additional piezoelectric material between the main piezoelectric stack and the piston and drive it with a voltage $V_x$ as shown in FIG. 3a. The equivalent circuit for this additional input is shown in FIG. 3b with a voltage V as part of the BB' wired system of FIG. 2b while the additional voltage Vx is to be used to mitigate the loss resistance, $R_1$. The velocity is u and the voltages V and Vx produce forces F and Fx through the electro-mechanical transformer ratios N and Nx in the form:

$$F = NV \text{ and } F_x = N_x V_x \quad (8)$$

This circuit may be simplified by use of Thevenin's Theorem with the representation shown in FIG. 3c with the total compliance $C = C_m + C$. This circuit can be further simplified at resonance, where $\omega_{r2} = 1/mC$, as illustrated in FIG. 3d.

It will be shown that the loss resistance, represented by $R_1$ can be effectively canceled by introducing a voltage $V_x = F_x/N_x$. Consider first the resistive resonant circuit where $R_1 = 0$, $F_x = 0$ and the velocity in the circuit is now $u_r$ and is only dependent on $R_r$ and the source force $FC_m/C$ so that here $$u_r = (FC_m/C)/R_r \quad (9)$$

If we now simultaneously introduce both $F_x$ and $R_1$ so the loss $u_r R_1$ is equal to the rise $F_x C_m/C$; thus, effectively cancelling $u_r R_1$, we also have $$u_r = (F_x C_{mx}/C)/R_1 \quad (10)$$

Equating Eq. (9) and Eq. (10), we get the required value for $F_x$ to cancel $R_2$, given as $$F_x = F(C_m/C_{mx})(R_1/R_r) \quad (11)$$

Equation (11) becomes a relation for voltages through V=F/N and $V_x = F_x/N_x$ yielding $$V_x = V(N/N_x)(C_m/C_{mx})(R_1/R_r) \quad (12)$$

Since the electromechanical turns ratios $N = dC_m$ and $N_x = dC_{mx}$ where d is the piezoelectric "d" constant and since $R_1/R_r = (1\eta - 1)$ where the mechanical efficiency $\eta = R_r(R_r + R_1)$, we may finally write $$V_x = VR_1/R_r = V(1\eta - 1) \quad (13)$$

Equation (13) shows, quite simply, that the required added voltage to cancel out the effect of the loss resistance is simply related to the efficiency. For $\eta = 1$ (i.e. 100% efficiency), $V_x = 0$, $\eta = 0.9$ (i.e. 90% efficiency) $V_x = 0.11$ while for $\eta = 0.5$ (i.e. 50% efficiency) $V_x = V$.

Figure 4:
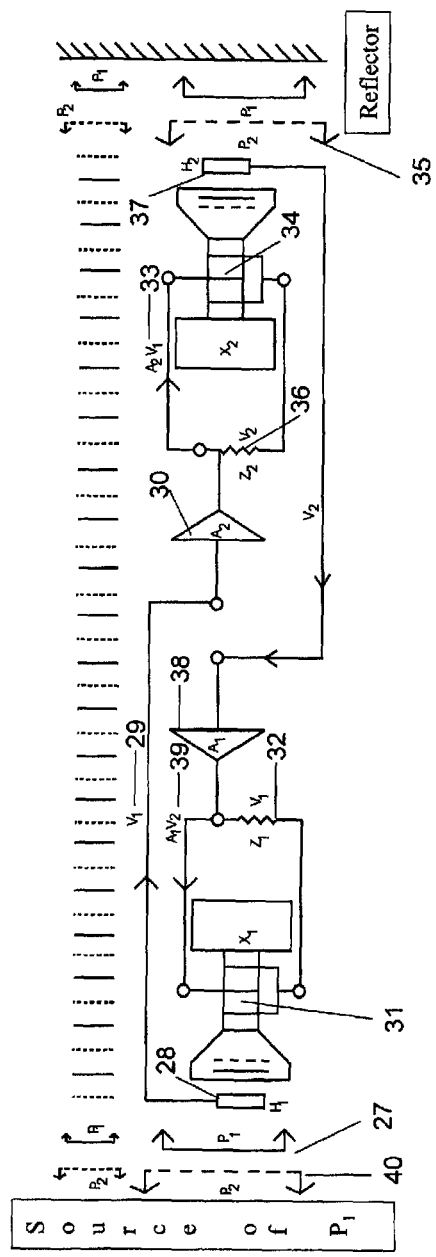
FIG. 4 is an illustration of transducer cloaking using separate hydrophone means allowing amplification, equalization and time delay so that the system can obtain an exact match to the reflected wave (illustrated above the transducers), and is an illustration using two separate hydrophones that are amplified and processed by amplifiers $A_1$ and $A_2$.

The quantity $F_x$ or the voltage $V_x$ of FIG. 3d will cancel out the loss resistance $R_1$. That is, the two forces F and $F_x$ (induced by the voltages V and $V_x$) together create a velocity $u_r = FC_m/CR_r$ just as though the resistor $R_1$ were not part of the circuit. In a sense, the additional source $F_x C_{mx}/C$ cancels out the force $u_r R_1$ so that $R_1$ no longer appears operative. The addition of this new transducer input port would require a small amplifier and a means of sampling the incoming or transported signal. This might be done from within the electrical circuit connecting opposite transducers at BB' or with a small array of additional hydrophones as indicated in FIG. 1. We note that procedure may also be used to compensate for reactive components $C_m$ and m at frequencies off resonance Consider now an alternative transducer cloaking approach, shown in FIG. 4, which illustrates the function of the wide band transducers, $X_1$ and $X_2$, now along with hydrophones, $H_1$ and $H_2$, and amplifiers, $A_1$ and $A_2$, as part of the targeted object instrumentation. The amplifier electronics allows compensation for transduction loss, provides response equalization and time delay so that the wave through the targeted object arrives in-step with the actual waves propagating next to the targeted object. As the pressure, $P_1$, 27, from the acoustic source arrives, the pressure is detected by the small hydrophone, $H_1$, 28, and sent along as, $V_1$, 29, to the amplifier/equalizer, $A_2$, 30. Meanwhile, the majority of the wave enters the transducer, $X_1$, tuned to the frequency of the sonar source, and is absorbed in the transducer and the matched load, $Z_1$, 32, eliminating any reflection off the piston face. Here transducer $X_1$ and impedance $Z_1$ act as a matched load to the input wave. The signal from hydrophone $H_1$ after amplifier $A_2$ is, $A_2 V_1$, 33, which drives transducer, $X_2$, 34, to reproduce the signal $P_1$ as if there were no targeted object in between; that is, as if it were acoustically invisible. This pressure now reflects, scatters or reverberates and arrives back as pressure, $P_2$, 35, is absorbed by transducer $X_2$, 34, and impedance $Z_2$, 36, and a small portion sampled by the hydrophone $H_2$, 37, is amplified and equalized by, amplifier $A_1$, 38, and drives transducer $X_1$, 31, with voltage $A_1 V_2$, 39, reproducing signal $P_2$, 40, which is sent toward the sonar source as if there were nothing between the sonar source and the reflector.

The target has now become completely acoustically invisible, —does not reflect incoming waves and does not leave a shadow. It appears acoustically transparent to incoming waves. Reflecting objects behind it will appear as though there were a clear path between the source and the reflecting objects behind the target. And the system appears as if the wave fronts propagated in the manner illustrated in the upper part of FIG. 4. The hydrophone may be imbedded into the transducer by use of one of the piezoelectric elements of the transducer as a hydrophone, illustrated in the transducer stack scheme of FIG. 3a with $V_x$ now the output voltage. In practice this element would be electrically isolated from the transducer wiring scheme used for transmitting the sound wave and should be positioned for maximum sensitivity. The transducer active cloaking will, in general, require an array of transducers that are phase steered to the incoming signal with corresponding phasing to the reproduced projected signal on the opposite side of the object body. Array curvature may require additional incremental steering to maximize the system performance The essence of the above acoustical system can be appreciated, visualized and applied using an optical active cloaking approach, illustrated in FIG. 5. A light source (like the sonar source), two monitors, $M_1$, 42 and, $M_2$, 43 (like transducers, $X_1$ and $X_2$) and electronic cameras, $C_1$, 44 and $C_2$, 45, (like hydrophones, $H_1$ and $H_2$) are illustrated as part of the targeted object to be cloaked, 46, (like the target submarine). Camera C1 receives the light and illuminates the body of the reflector while camera C2 has a view of the reflector, 47, and displays it on monitor $M_1$. When the system is turned off the targeted object will block the body of the reflector, only the head 50 and legs 51 of the reflector will be seen and the targeted object will be seen as a dark monitor screen along with the shadow of the object. When the system is operating, the eye, 49, (like the enemy sonar receiver) should see the full body 52, head 50 and legs 51 of the reflector, and there will be no shadow and the targeted object, 46, will appear to be transparent and invisible, as in the case of a fully cloaked object.

Another feature is the provision for adjusting the resonance of the cloaking transducers to match the frequency of the source or alternatively increase the resonance bandwidth of the transducer. This may be accomplished by using electrical components to increase the mechanical mass 22, and to also decrease the mechanical compliance 23. The following illustrates how these mechanical components 22 and 23, as well as the loss resistance, 21, and clamped capacitance 25 of FIGS. 2a and 2b may be canceled by a negative impedance converter, referred to as a NIC. The cancellation of the mechanical loss resistance is important as it provides a means for the transducer cloaking system to act as though it were 100% efficient and achieve a desired medium characteristic impedance of pc as well as 100% transmission of the acoustic pressure. It is noted that the overall system is not truly 100% efficient, as it uses power to operate the NIC.

Figure 6A:
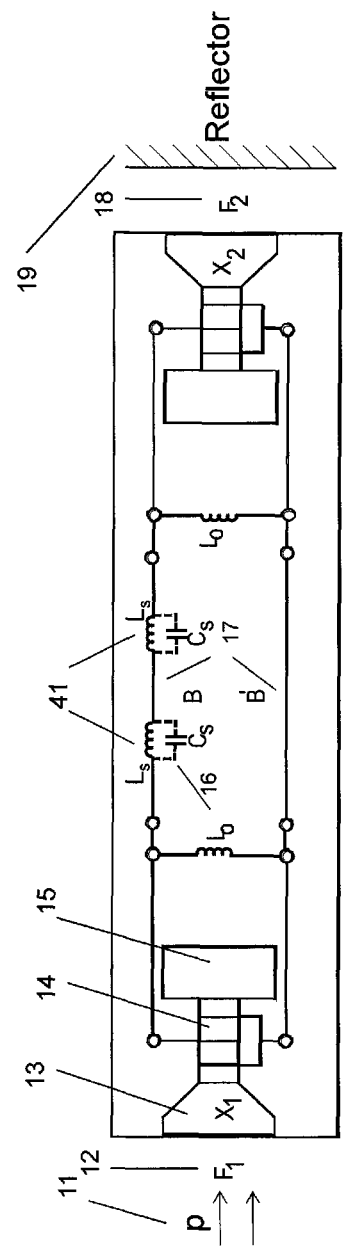
FIG. 6a is a modified physical illustration of FIG. 2a which now includes coils 41 of value $L_s$.
Figure 6B:
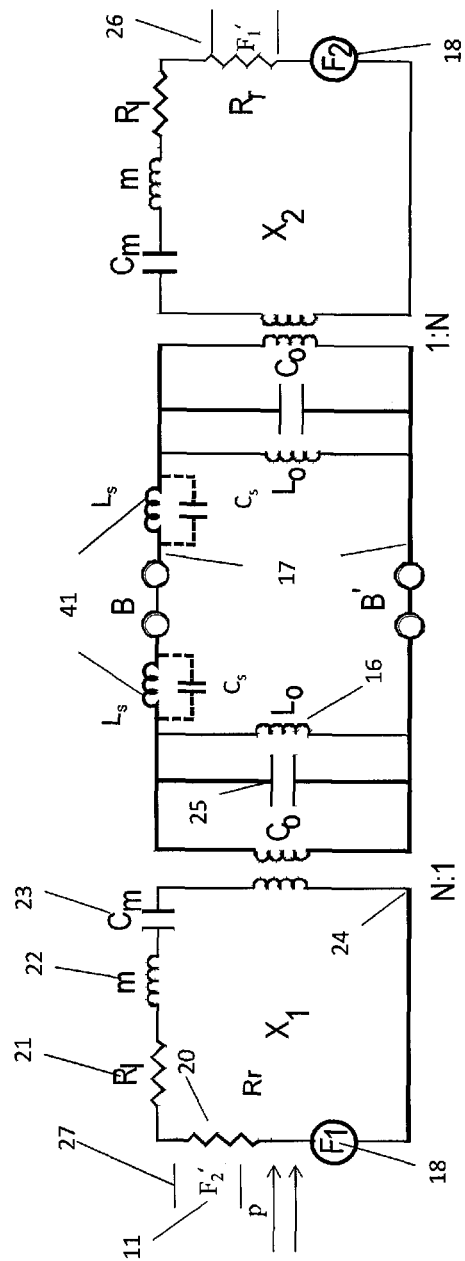
FIG. 6b is a modified equivalent circuit illustration of FIG. 2b which now includes coils 41 of value $L_s$.

Consider first an electrical component means, shown in physical and equivalent circuit embodiments of FIGS. 6a and 6b, for lowering the mechanical resonance frequency, $f_r = \omega_r/2\pi$. FIGS. 6a and 6b are based respectively on FIGS. 2a and 2b, where a shunt tuning inductor 16 of value, $L_0 = 1/C_0\omega_{r2}$, cancels the clamped capacitance 25 of value $C_0$ at the mechanical resonance frequency $\omega_r = 1/(mC_m)^{1/2}$. This shunt tuning condition allows the use of a series inductor 41 of value $L_s$ (without capacitor Cs connected) to add an equivalent mass of value $N^2L_s$ to the actual mass 22 of value m for a new total mass of $m+N^2L_s$ thereby reducing the resonant frequency, $\omega_r$, by the factor $1/(1+N^2L_s/m)^{1/2}$. For example if $N^2L_s$ is set equal to m, the new resonance frequency will be $f_r/\sqrt{2}$. Note that in this case $L_0$ must be increased by a factor of 2 since the new resonance is now operating at the lower value of $f_r/\sqrt{2}$. The resonance frequency may also be raised by replacing, 41, the series inductor Ls by a series capacitor $C_s$ (shown with dashed line connection) raising the resonance frequency, with increasingly smaller values of $C_s$, by the factor $(1+N^2C_m/C_s)^{1/2}$. And, as before, the value of $L_0$ must be changed to tune out $C_0$ at the new higher operating resonance.

Figure 7:
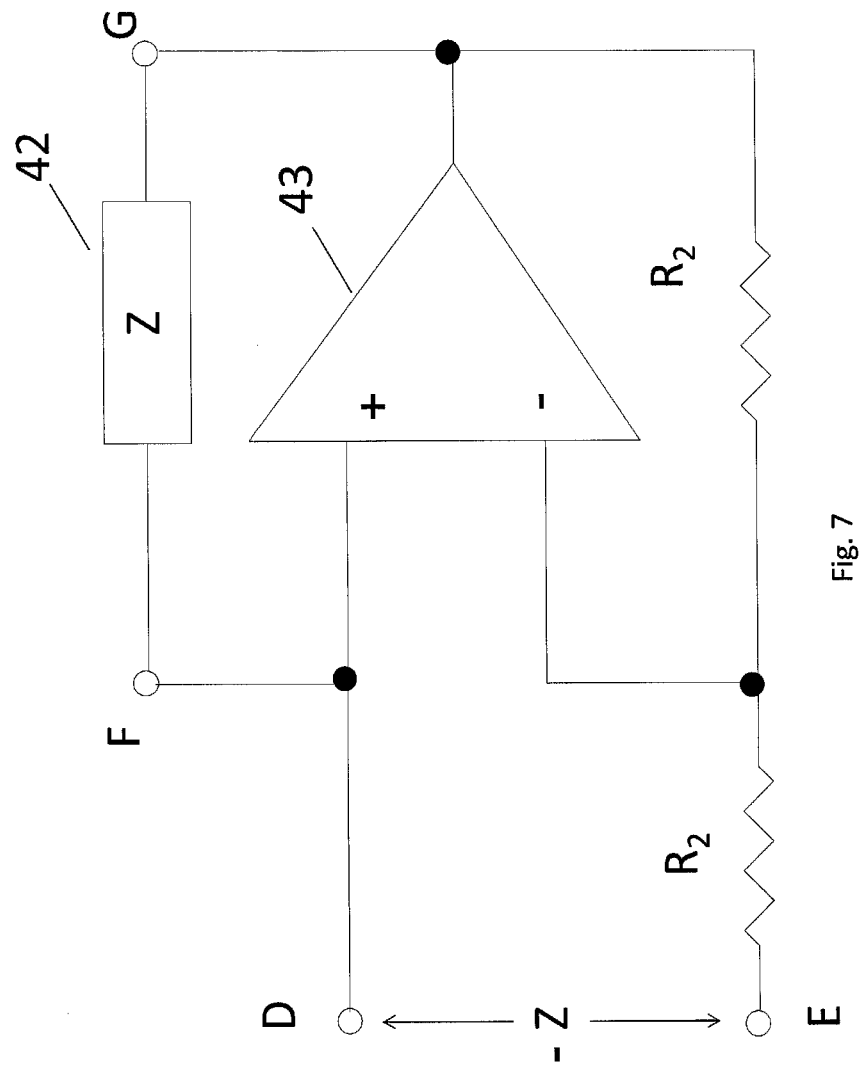
FIG. 7 is an illustration of a negative impedance converter of impedance 42 using operational amplifier 43 and producing impedance −Z at terminals D,E.

The use of negative impedance converters would be compatible with our invention as the acoustic cloaking transducers would normally transmit only the small power that is received from a distance acoustic source. An illustration of an electronic negative impedance converter means is shown FIG. 7 where the impedance Z, item 42, is in a feedback circuit of an operational amplifier, 43, and is generated at the terminals D, E, as the negative impedance –Z. Substitution of a capacitor, C, for Z in terminals F, G yields the impedance $-1/j\omega C$ at terminals D,E. Substitution of inductor L for Z in terminals F,G, yields the impedance $-j\omega L$ at terminals D,E. And, finally, substitution of R for Z in terminals F,G yields the resistance –R at terminals D,E.

Figure 8A:
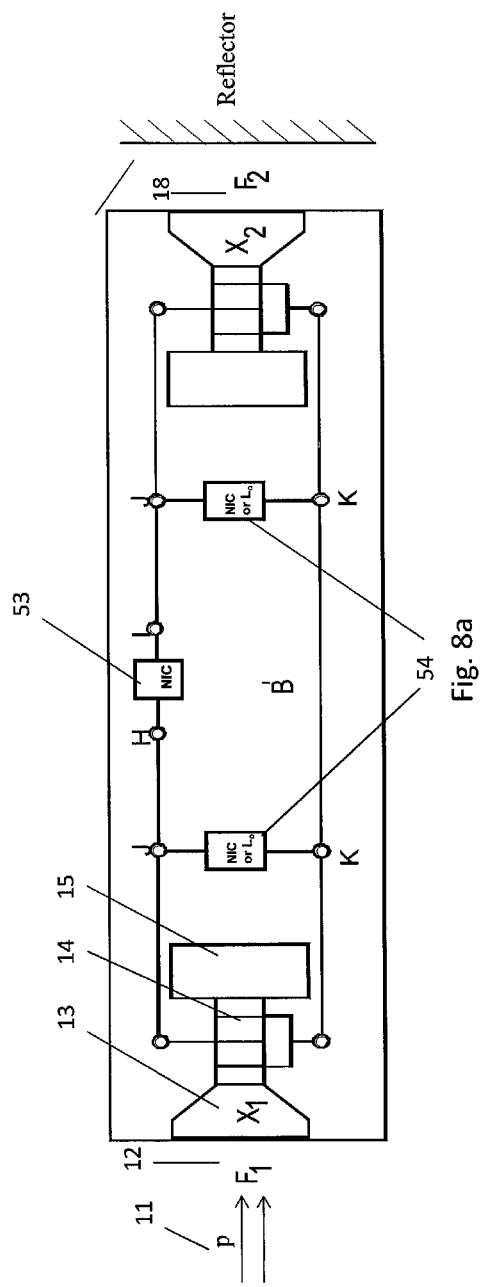
FIG. 8a is a modified physical illustration of FIG. 2a with terminals H, I and J, K.
Figure 8B:
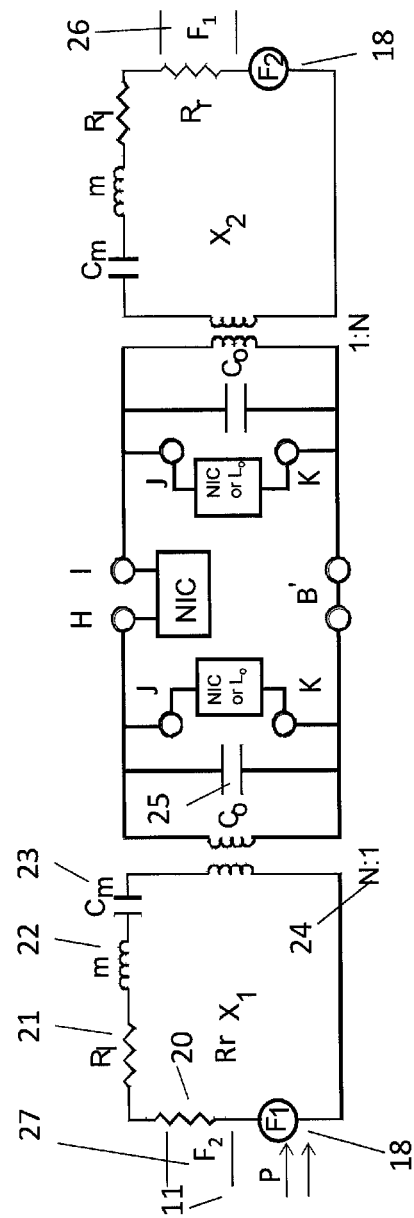
FIG. 8b is a modified equivalent circuit illustration of FIG. 2b with terminals H, I and J, K.

FIGS. 8a and 8b are respectively the same as FIGS. 2a and 2b except terminal B has been opened up now as terminals H,I and the inductances $L_0$ have been replaced by terminals J,K allowing the negative impedance terminals D,E (FIG. 7) to be connected at terminals J,K and H,I. Consider first the case were we still have tuned inductors, $L_0$, connected to terminals J,K but we now use the negative impedance converter of FIG. 7, with the Z of item 42 replaced with $2R_1$ and connect the D,E terminals of FIG. 7 on to the H,I terminals of FIGS. 8a and 8b. In this case we have the same condition as in FIGS. 2a and 2b but inserted a resistance $-2R_1$ replacing the short circuit at B of FIG. 2b. This procedure will cancel the two loss resistances, $R_1$, and yield a cloaking transducer with characteristic impedance pc and transmit the acoustic acoustical pressure through the cloaking transducers without loss.

Figure 9:
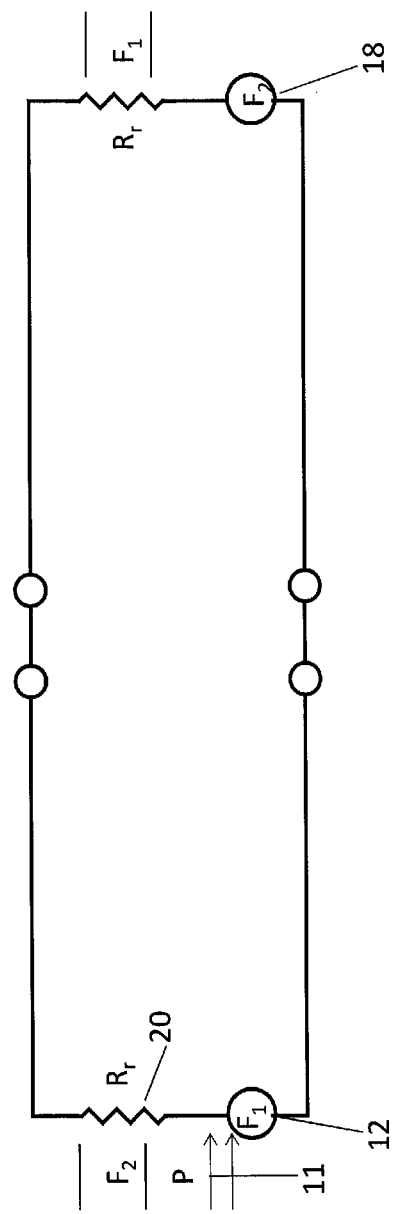
FIG. 9 is an modified illustration of FIG. 2c with radiation resistances 20 of value and with no loss resistance 21 of value $R_1$.

Three negative impedance units may be used to also provide a wideband, lossless resonance performance by cancelling the components $R_1$, m, $C_m$ and $C_0$ over a wide band of frequencies. The electrical capacitance $C_0$ may be cancelled by use of two units of FIG. 7 with the capacitance $C_0$ replacing Z and connecting terminals D,E of each unit to each of the J,K terminals of FIGS. 8a and 8b (with $L_0$ removed). And finally, one can cancel the mechanical components $R_1$, m and $C_m$ by replacing Z of FIG. 7 with the value $2®+1j\omega L+1/j\omega C)$, where $R=R_1/N^2$, $L=m/N^2$ and $C=N^2C_m$, and by connecting terminals D,E of FIG. 7 to terminals H,I of FIGS. 8a and 8b. This will lead to the equivalent circuit results of FIG. 9 over a wideband of frequencies with an accuracy which depends on the bandwidth of the operational amplifier of FIG. 7 and the quality of the matched components as well as the equivalent circuit representation used.

Figure 5:
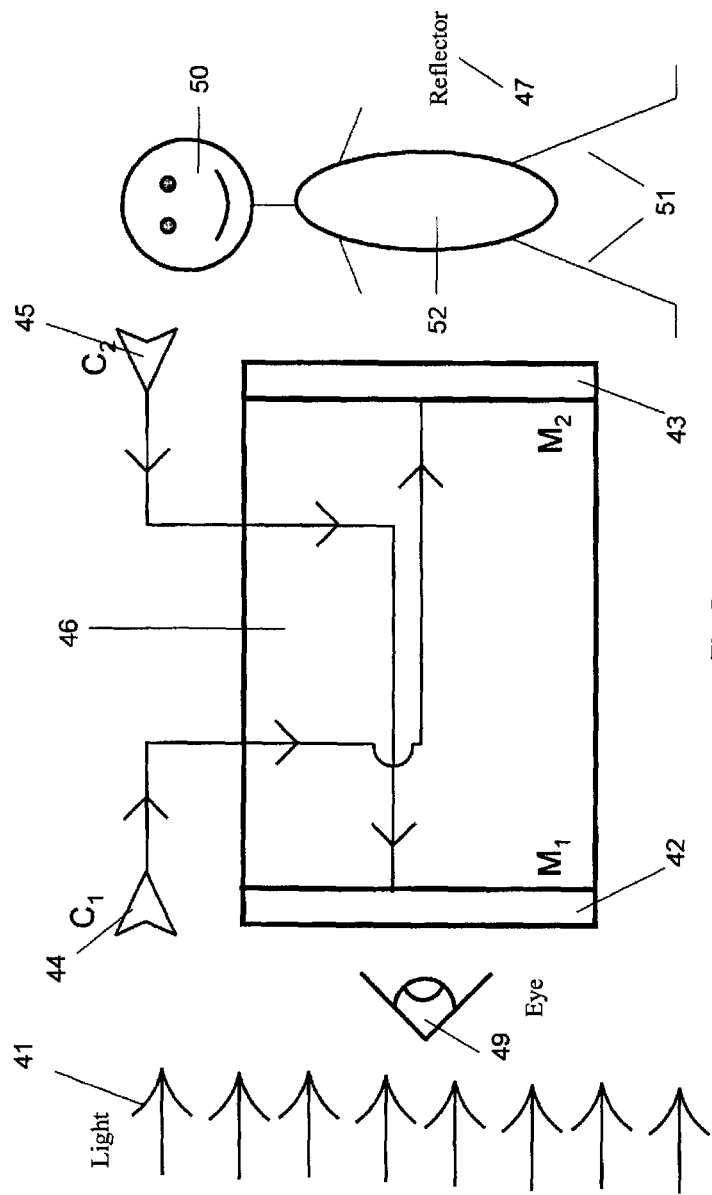
FIG. 5 is an illustration of an analogous optical active cloaking system from the invention illustrated in FIG. 4 but instead using optical monitors $M_1$ and $M_2$ and cameras $C_1$ and $C_2$.

Having now described a limited number of embodiments of the present invention, it should now become apparent to those skilled in the art that numerous other embodiments and modifications thereof are contemplated as falling within the scope of the present invention as defined in the appended claims. Examples of modification would be the use of other transduction devices and materials other than piezoelectric ceramic (e.g. PZT) such as, PVDF. piezoelectric single crystal material, magnetostrictive, electrostriction, variable reluctance or moving coil systems, as well as piezoelectric rings, composites and flextensional transducer designs. Moreover, the invention is not limited to water and may be used in air applications. The invention may be applied as an active cloaking means for electromagnetic waves such as light waves, as illustrated in FIG. 5. Similarly it may be applied to radar waves in radar systems with a different type of transducer, i.e., an antenna which converts air-born electromagnetic waves to electrical signals in (or on) wires and vice versa.

Figure 10A:
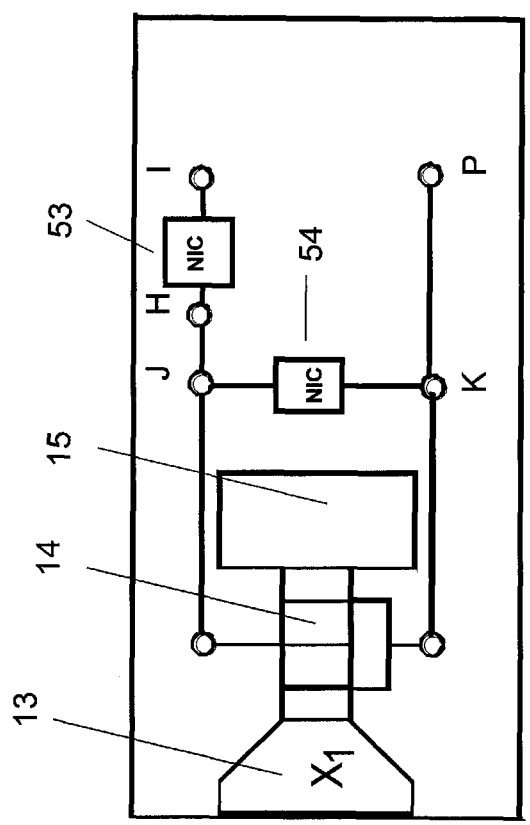
FIG. 10a is a modification of physical illustration FIG. 8a showing a single conventional transducer with terminals J,K and H,I for inserting electrical components or negative impedance converters along with transducer terminals I,P for either driving the transducer with a voltage source or for the open circuit receiving voltage response for the transducer with input acoustic pressure p.
Figure 10B:
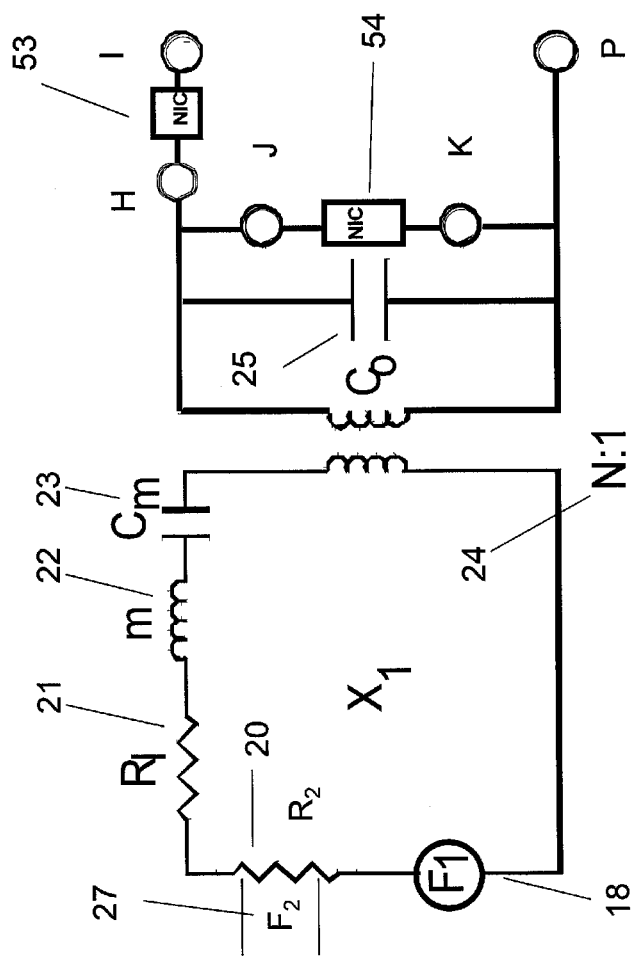
FIG. 10b is a modification of equivalent circuit illustration FIG. 8b showing a single conventional transducer with terminals J,K and H,I for inserting electrical components or negative impedance converters along with transducer terminals I,P for either driving the transducer with a voltage source or for the open circuit receiving voltage response for the transducer with input acoustic pressure p.

In addition to the means for changing the mechanical resonance frequency of cloaking transducers by using electrical components such as inductors $L_s$ and capacitors $C_s$ and using negative impedance converters to increase the bandwidth as well as improving the cloaking transducer efficiency this means can also be used to improve the performance of other more conventional transducer applications that are used in addition to cloaking or not necessarily used for cloaking Physical and equivalent circuit illustrations of such a transducer are shown in FIGS. 10a and 10b with input terminals I,P, for connecting a low impedance volt source, when used as a projector; or when used as a receiver, with output voltage terminals I,P in addition to terminals H, I and J,K to be used for inserting electrical components or negative impedance converters.

What is claimed is:

1. An electro-acoustic cloaking transducer system for cloaking a targeted object including transducer means, said targeted object having front and rear object ends, said system to provide an acoustic transduction cloak on or about the targeted object so that incoming sound appears to pass through the targeted object without reflecting sound from the targeted object and also leaving no acoustic shadow so as to thus appear acoustically invisible, said transducer means comprising at least one pair of transducers including front and rear transducers that are positioned on the respective front and rear object ends of the targeted object and circuit means disposed on the targeted object and inter-coupling the front and rear transducers, said front transducer positioned to absorb an impinging wave front substantially without reflections and said rear transducer positioned for re-transmitting the wave front at the rear side, said circuit means comprising electrical wiring connected between the front and rear transducers providing bi-directional signal transmission between the front and rear transducers.

2. An acoustic cloaking transducer system as set forth in claim 1 in which the transducer means is used as an integral part of an acoustic SONAR system.

3. An acoustic cloaking transducer system as set forth in claim 1 in which the transducer means is constructed of material from the group of piezoelectric ceramic, PVDF, piezoelectric composite, piezoelectric single crystal, electrostrictive, magnetostrictive, variable reluctance or moving coil.

4. An acoustic cloaking transducer system as set forth in claim 1 that operates in air or in water.

5. An acoustic cloaking transducer system as set forth in claim 1 in combination with a reflector surface for receiving the re-transmitted wave front that is reflected and passes back through the targeted object emerging as a wave front from the front transducer, as if the targeted object were absent, said reflector surface positioned spaced off of the rear object end.

6. An acoustic cloaking transducer system as set forth in claim 1 wherein both the front and rear transducers each comprises a matched pairs of transducers electrically connected together via said circuit means and each pair positioned respectively on the front and rear end of the targeted object to provide active cloaking of the targeted object.

7. An acoustic cloaking transducer system as set forth in claim 6 wherein each transducer includes additional electrical ports to allow receipt additional electrical power to compensate for losses in the transducers.

8. An acoustic cloaking transducer system as set forth in claim 6 including a characteristic acoustic impedance, $\rho c/\eta$, that is nearly acoustically matched to the medium of characteristic impedance $\rho c$, where $\rho$ is the density and c is the sound speed, providing nearly complete transmission from front to back and back to front of the target.

9. An acoustic cloaking transducer system as set forth in claim 1 wherein the circuit means includes a first hydrophone for sensing the impinging wave to control the rear transducer, and a second hydrophone for sending a reflected wave to control the front transducer.

10. An acoustic cloaking transducer system as set forth in claim 9 including transducer electrical load impedances associated respectively with the front and rear transducers that create an impedance that is matched to the water through the transducers that absorb the incoming acoustic wave, amplifiers to increase the signal from the hydrophones, equalizers for uniform response and time delays to match the time of travel through the water or gas so as to provide active cloaking of the targeted object.

11. An acoustic cloaking transducer system as set forth in claim 9 including pairs of transducers that may also be used as hydrophones through an additional electro-acoustic port in the transducers eliminating the need for separate hydrophones.

12. An acoustic cloaking transducer system set forth in claim 1 including at least one shunt inductance and at least one clamped capacitance, the shunt inductance to tune out the clamped capacitance allowing the mechanical resonance frequency of both transducers to be lowered by means of an electrical inductance which adds an effective mechanical mass to each of the actual mechanical masses m.

13. An acoustic cloaking transducer system set forth in claim 1 including at least one shunt inductance and at least one clamped capacitance, the shunt inductance to tune out the clamped capacitance allowing the mechanical resonance frequency of both transducers to be increased by means of an electrical capacitance which adds an effective mechanical stiffness to the actual effective mechanical stiffness.

14. An acoustic cloaking transducer system set forth in claim 1 including at least one shunt inductance and at least one clamped capacitance, the shunt inductance to tune out the clamped capacitance of both transducers at resonance allowing the transducer efficiency to be increased and approach 100% by adding a series negative resistance by means of a negative impedance converter.

15. An acoustic cloaking transducer system set forth in claim 1 including negative impedance converters to increase the bandwidth and efficiency of the transducers by effectively adding negative capacitances in shunt to cancel the clamped capacitances and also by adding a negative version of the mechanical impedance of the transducer, without the radiation resistance, in electrical series of the two transducers to cancel the mechanical impedance of the transducer but not the radiation resistance.

16. An acoustic cloaking transducer system for cloaking a targeted object including transducer means, said targeted object having front and rear object ends, said system to provide an acoustic transduction cloak on or about the targeted object so that incoming sound appears to pass through the targeted object without reflecting sound from the targeted object and also leaving no acoustic shadow so as to thus appear acoustically invisible, said transducer means comprising at least one pair of transducers including front and rear transducers that are positioned on the respective front and rear object ends of the targeted object and circuit means disposed on the targeted object and inter-coupling the front and rear transducers, said front transducer positioned to absorb an impinging wave front substantially without reflections and said rear transducer positioned for re-transmitting the wave front at the rear side, further including shunt inductances and clamped capacitances with the shunt inductances able to tune out the clamped capacitances allowing the mechanical resonance frequency of the transducer to be lowered by means of a series electrical inductance which adds an effective mechanical mass to the actual mechanical masses or raise the resonance frequency by means of series electrical capacitance which adds an effective mechanical stiffness to the actual effective mechanical stiffness.

17. An acoustic cloaking transducer system as set forth in claim 16 wherein said circuit means comprises electrical wiring connected between the front and rear transducers providing bi-directional signal transmission between the front and rear transducers.

18. An acoustic cloaking transducer system for cloaking a targeted object including transducer means, said targeted object having front and rear object ends, said system to provide an acoustic transduction cloak on or about the targeted object so that incoming sound appears to pass through the targeted object without reflecting sound from the targeted object and also leaving no acoustic shadow so as to thus appear acoustically invisible, said transducer means comprising at least one pair of transducers including front and rear transducers that are positioned on the respective front and rear object ends of the targeted object and circuit means disposed on the targeted object and inter-coupling the front and rear transducers, said front transducer positioned to absorb an impinging wave front substantially without reflections and said rear transducer positioned for re-transmitting the wave front at the rear side, and further including negative impedance converters to increase the bandwidth and efficiency of the transducers by adding a negative clamped capacitance in shunt with the actual clamped capacitance and by adding a negative version of the mechanical impedance of the transducer, without the radiation resistance, in electrical series with the transducer to cancel the mechanical impedance of the transducer but not the radiation resistance.

19. An acoustic cloaking transducer system as set forth in claim 18 wherein said circuit means comprises electrical wiring connected between the front and rear transducers providing bi-directional signal transmission between the front and rear transducers.

* * * * *